United States Patent
Akoh et al.

(10) Patent No.: US 6,187,355 B1
(45) Date of Patent: *Feb. 13, 2001

(54) RECOVERY OF USED FRYING OILS

(75) Inventors: Casimir C. Akoh; Aaron Estes Reynolds, Jr., both of Athens, GA (US)

(73) Assignee: The University of Georgia Research Foundation, Inc., Athens, GA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/325,250

(22) Filed: Jun. 3, 1999

Related U.S. Application Data

(60) Provisional application No. 60/088,481, filed on Jun. 8, 1998.

(51) Int. Cl.[7] .................................................. A23D 9/007
(52) U.S. Cl. ..................... 426/330.3; 426/423; 106/38.3; 210/502.1; 502/410; 502/439
(58) Field of Search ................................. 426/330.6, 423; 502/410, 439; 210/502.1; 423/331, 332, 334; 106/38.3

(56) References Cited

U.S. PATENT DOCUMENTS

| | | | |
|---|---|---|---|
| 3,231,390 | * 1/1966 | Hoover . | |
| 3,382,199 | * 5/1968 | Scullen . | |
| 3,649,656 | 3/1972 | Taussky | 260/412.7 |
| 3,947,602 | 3/1976 | Clewell, Jr. et al. | 426/417 |
| 4,112,129 | 9/1978 | Duensing et al. | 426/417 |
| 4,330,564 | * 5/1982 | Friedman | 426/423 |
| 4,349,451 | 9/1982 | Friedman | 252/190 |
| 4,443,379 | 4/1984 | Taylor et al. | 260/427 |
| 4,681,768 | 7/1987 | Mulflur et al. | 426/417 |
| 4,701,438 | * 10/1987 | Taylor | 502/405 |
| 4,734,226 | 3/1988 | Parker et al. | 260/424 |
| 4,735,815 | 4/1988 | Taylor et al. | 426/417 |
| 4,764,384 | 8/1988 | Gyann | 426/417 |
| 4,880,652 | * 11/1989 | Regutti | 426/423 |
| 4,882,188 | * 11/1989 | Sawoda | 426/438 |
| 4,913,922 | 4/1990 | Hawkes et al. | 426/417 |
| 4,968,518 | * 11/1990 | Lopez | 426/330.6 |
| 4,988,440 | 1/1991 | Bernard et al. | 210/504 |
| 5,200,224 | 4/1993 | Friedman | 426/417 |
| 5,229,013 | 7/1993 | Regutti | 210/778 |
| 5,252,762 | 10/1993 | Denton | 554/196 |
| 5,348,755 | 9/1994 | Roy | 426/541 |
| 5,354,570 | 10/1994 | Friedman | 426/417 |
| 5,597,600 | 1/1997 | Munson et al. | 426/330.6 |
| 6,030,645 | * 2/2000 | Tritach . | |

FOREIGN PATENT DOCUMENTS

| | | |
|---|---|---|
| 5-308911 | 11/1993 | (JP) . |
| 9-273071 | * 10/1997 | (JP) . |
| 10-036225 | * 2/1998 | (JP) . |
| 7314935 | * 6/1974 | (NL) . |

OTHER PUBLICATIONS

R.A. Yates et al., "Regeneration of Oils Used for Deep Frying: A Comparison of Active Filter Aids", Journal of the American Oil Chemists' Society, vol. 70, No. 5, May 1993, pp. 507–511.

J. Mancini–Filko et al. "Effects of Selected Chemical Treatments on Quality of Fats Used for Deep Frying" JAOCS, vol. 63, No. 11, Nov., 1986.

C. Booth et al. "Trial of new oil treatment for deep fryers" Food Australia, 46 (8), 1994.

R. A. Yates et al. "Adsorptive Capacity of Active Filter Aids for Used Cooking Oil" JAOCS, vol. 69, No. 9, Sep., 1992.

J. McNeill et al. "Improving the Quality of Used Frying Oils by Treatment with Activated Carbon and Silica" JAOCS, vol. 63, No. 12, Dec., 1986.

Z. Y. Zhu et al. "The Determination of Active Filter Aid Adsorption Sites by Temperature Programmed Desorption" JJAOCS, vol. 71, No. 2, Feb., 1994.

W. B. Zhang et al. "Evaluation of Frying Oil Filtration Systems" Journal of Food Science, vol. 57, No. 3, 1992.

* cited by examiner

*Primary Examiner*—Carolyn Paden

(57) ABSTRACT

Treatment and recovery of used frying oils uses combinations of adsorbents and antioxidants which provide unexpected improvements in used frying oil adsorptive and other properties, quality and service life such that the recovered frying oil can be reused. Used frying oil can be treated with a ternary mixture of adsorbents comprising calcium silicate, magnesium silicate and at least one of a porous rhyolitic material and silicon dioxide in effective amounts to unexpectedly and significantly reduce free fatty acids of the treated used frying oil as well as improve total polar component, oil stability and color thereof. Combinations of antioxidants can be included in the treated oil in effective amounts to provide unexpected, significant improvements in oil stability and service life of the treated used frying oil.

20 Claims, 7 Drawing Sheets

RECOVERY OF USED FRYING OILS

This application claims the benefits of U.S. Provisional Application Ser. No. 60/088,481 filed Jun. 8, 1998.

FIELD OF THE INVENTION

The present invention relates to the treatment of used frying oils for reuse and, more particularly, to the treatment of used frying oils with combinations of adsorbent agents effective to improve frying oil properties and quality and extend the service life of frying oils.

BACKGROUND OF THE INVENTION

Fried foods are desired for their distinctive flavor and odor. To some extent in diet, they provide healthy nutrients, such as essential fatty acids, vitamins, and fiber. After cooking, the frying medium is partially absorbed by the finished (fried) food. Therefore, the quality of frying oils is important to both food consumers and to the food service industry.

The free fatty acid content of used frying oil is an indicator of frying oil deterioration and increases with time of cooking as a result of hydrolysis of triacylglycerols as well as further decomposition of hydroperoxides. The released fatty acids are more susceptible to thermal oxidation under frying temperatures than those esterfied to glycerol. The oxidized products of fatty acids impart off-flavors and off-odors (hydrolytic rancidity) to the frying medium and fried foods. Frying oil deterioration over time eventually can reach a rapidly accelerating, uncontrolled rate. K. G. Berger in an article in INFORM, 8, 812–814, 1997, suggested control of free fatty acids to about 0.4% to prevent acceleration of the break-down of frying oil fats.

The treatment and recovery of used frying oils thus is of commercial and economic importance to the food consumers and the food service industry.

Frequent filtration treatments of frying oils have been found to improve oil service life and improve health aspects of finished (cooked) food products by controlling build up of free fatty acids and removing insoluble particles. A filtration operation typically involves passing the used frying oil through a filter paper or cloth, which removes food bits and thereby reduces the chance of deleterious reactions caused by such materials in the oil. Certain adsorbents have been used to adsorb fat soluble degradation products as well as remove insoluble particles.

Commonly used adsorbents can be categorized into two subgroups; namely, natural adsorbents and synthetic adsorbents. Natural adsorbents include such materials as attapulgites, bentonites, zeolites, active carbon, kaolin, active silica, diatomaceous earth, active alumina, and active magnesia. Synthetic adsorbents have included blends of silicates with magnesium and aluminum oxides, and various silicates formed through fusing lime, magnesium, and aluminum oxides with diatomaceous earth. Dry powders of the adsorbents typically are slurried with the oil in the fryer and then circulated through a filter and returned back to the fryer until a filter bed or cake is established and the fryer is free of fines and particles. Then, the cleaned frying oil is pumped back into the fryer.

During the past ten years, various adsorbent agents have been developed. For instance, McNeil et al. in an article in J. Am. Oil Chem. Soc. 63:1564–1567, 1986, reported that a mixture of activated carbon and silica reduced 53.9% acid value and 38.3% photometric color of used frying oil, although stability of the fat may have been affected.

Mancini-Filho et al. in an article in J. Am. Oil Chem. Soc. 63:1452–1456, 1986, reported that treatment of used frying oil with a mixture of 4.5% clay, 0.5% charcoal, 2.5% magnesium oxide, and 2.5% Celite showed significant improvement in dielectric constant changes, free fatty acids, and color by 6%, 14%, and 58%, respectively. However, even though two antioxidants comprising 50 ppm butylated hydroxyanisole (BHA) and 1000 ppm ascorbyl palmitate (AP) and an antifoam agent comprising 10 ppm dimethylpolysiloxane] were added into the treated used fats, continued frying for additional 15 hours led to greater deterioration of the used oil as compared to untreated oil samples. A fresh partially hydrogenated soybean oil used at a turnover rate of 5 hours was found to increase dielectric constant changes, free fatty acids, and color after 24 hours much faster in treated oils than in untreated control oil samples.

On the other hand, daily treatment of used frying oil using Frypowder adsorbent agent maintained levels of alkaline contaminant material relatively constant over days of cooking as reported by Booth et al. in an article in Food Australia, 46:372–374, 1994. Frypowder adsorbent agent comprises porous rhyolite, citric acid and water sold commercially as a powder by MirOil Corporation, Allentown, Pa. The color darkening and foaming tendency as well as formation of polar component, conjugation, and dielectric constant of frying oil during frying also was apparently reduced by Frypowder treatment as reported by Kim et al. in an article in Korean Food Sci. Technol. 20:637–643, 19988. However, Frypowder adsorbent agent does not adsorb fatty acids due to its natural acidic characteristic, which depends on the citric acid composition, as described by Booth et al. in Food Australia, 46:372–374, 1994.

In view of the importance of the quality of frying oils to both food consumers and to the food service industry and of the commercial and economic importance of recovery of used frying oils, there continues to be a need for improved treating agents, such as adsorbent agents, useful in the treatment and recovery of used frying oils for reuse.

It is an object of the present invention to satisfy this need.

SUMMARY OF THE INVENTION

The present invention involves treatment and recovery of used frying oils using combinations of adsorbent agents and antioxidants which provide unexpected improvements in used frying oil adsorptive and other properties, quality and service life such that the recovered frying oil can be reused by the food service industry.

An illustrative embodiment of the present invention involves treating used frying oil with a ternary mixture of adsorbent treating agents comprising calcium silicate, magnesium silicate, and at least one of a porous rhyolitic material and silicon dioxide in effective amounts to unexpectedly and significantly reduce free fatty acids of the treated used frying oil to a level comparable to that of fresh frying oil as well as to improve total polar component, oil stability and color. In an exemplary embodiment, the mixture comprises, in weight percent of the frying oil treated, about 1 to about 3 weight % calcium silicate, about 1 to about 3 weight % magnesium silicate and about 1 to about 3 weight % of one of porous rhyolitic material and silicon dioxide.

In another illustrative embodiment the present invention, combinations of antioxidants are included in the treated oil in effective amounts to provide unexpected, significant improvements in oil stability and service life of the treated used frying oil.

DESCRIPTION OF THE INVENTION

Figure 1:
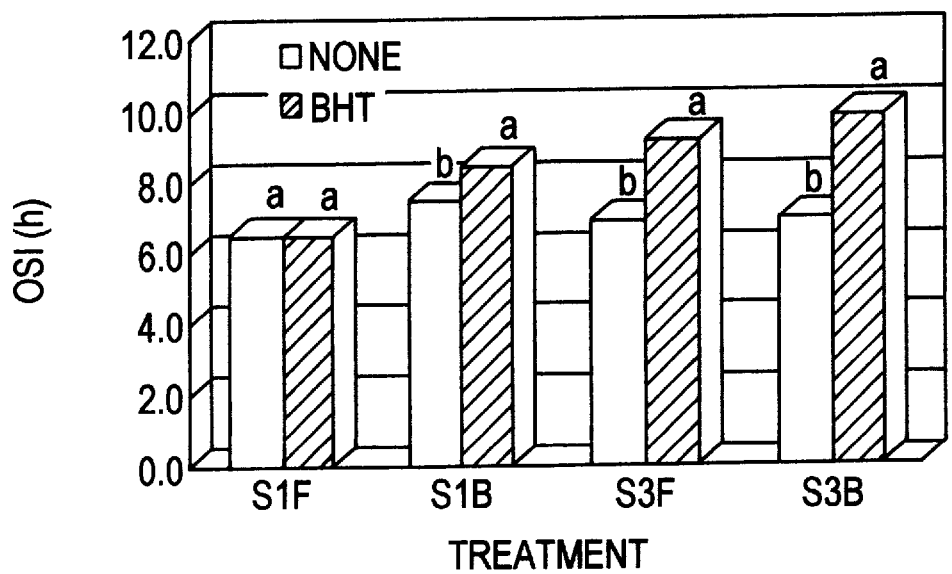
FIG. 1 is a bar graph showing the effects on OSI value of treatment of used frying oil with adsorbent mixtures F and B with and without BHT antioxidant.

The present invention provides for the treatment and recovery of used frying oils using novel combinations of adsorbent agents and antioxidants which provide unexpected improvements in used frying oil adsorptive and other properties, quality and service life such that the recovered frying oil can be reused by the food service industry. As used herein, frying oil includes vegetable oils and animal fats which are liquid at cooking temperatures involved and include, but are not limited to, lard, tallow, soybean oil, peanut oil, palm oil, cottonseed oil, canola oil, olive oil, sunflower oil, safflower oil and other cooking fat/oil, which may be hydrogenated. Various adsorbent agents set forth in Table 1 were tested in the treatment of frying oil samples, one sample being fresh frying fat (designated F531) and the other being used frying fat (designated S516) obtained from a food processor. The fresh fat was a partially hydrogenated soybean oil (PHSBO) refined by Cargill Inc., Minneapolis, Minn. The fresh fat was opaque at rom temperature and turned pale yellow when heated. The used fat comprised the same soybean oil but taken from a commercial fryer after frying chicken breast, pork chops shapes, and rib meat at 360 degrees F. for 15 hours.

The adsorbent agents set forth in Table 1 were non-toxic, odorless and tasteless and met FAO/WHO (Food & Agricultural Organization/World Health Organization) JECFA specification for identity and purity.

The manufacturing sources and properties of the adsorbent agents are shown in Table 1.

TABLE I

ADSORBENTS AND THEIR SPECIFICATIONS

| Name | Composition | Specific Properties | Manufacturer |
| --- | --- | --- | --- |
| Silasorb (Si) | Calcium silicate | Hydrothermal product from diatomaceous silica, density 6–10 lbs/Ft$^3$. 16–20 microns, pH 9.0–10.5, while, odorless powder. | Celite Corporation, Lompoc, PA |
| Britesorb (Br) | Silicon dioxide, aluminum hydroxide and water | R100, amorphous, white, odorless powder. | PQ Corporation, Valley Forge, PA. |
| Hubersorb 600 (HB) | Calcium silicate | 6 microns, pH 10, amorphous, white, odorless powder. | J. M. Huber Corporation, Havre de Grace, MD. |
| Calsilite (Ca) | Calcium silicate | pH 8–10, density >1.0, pipe insulation and ground up to powder. | Filtration Sales and Services, Inc. Tucker, GA |
| Purifry (Pu) | Aluminum silicate, alumina, silica and citric acid | 2 microns. | Square Deal Development, LL.C. Lutcher, LA. |
| Frypowder (Fr) | Porous rhyolite, citric acid and water. | Size B, white, granular, odorless powder. | MirOil Corporation, Allentown, PA. |
| Activated Carbon (AC) | Activated carbon. | 95% 325 mesh, APA 12 × 40, black, granular powder. | Calgon Carbon Corporation, Pittsburgh, PA. |
| Magnesol (Ma) | Magnesium silicate | Synthetic, amorphous, hydrous form, white, odorless powder. | Dallas Group of America, Inc. Jeffersonville, IN. |
| Sorbead AF (So) | Aluminum silicate | Round beads. | Filtration Sales and Services, Inc. Tucker, GA |

In Table 1, free fatty acid (FFA) content of the oil samples was determined by AOCS (American Oil Chemists Society) official and recommended method Ca 5a-40 (AOCS 1989), which was modified by using 30 mL ether/ethanol/water 3:3:2 (v/v/v where v is volume) to dissolve 5.0 grams of oil sample (see Foglia et al article in J. Am. Oil Chem. Soc. 70, 281–285, 1988) and by using a 12 mm glass column (see Sebedio et al article in J. Am. Oil Chem. Soc. 63, 1541–1543, 1986 and Dobarganes et al article in J. Am. Oil Chem. Soc. 65, 101–105, 1988). A 0.5 gram oil sample was dissolved in 5 mL petroleum ether/ethyl ether (92:8, v/v) and added to the column, followed by elution with 20–25 mL of the above nonpolar solvent to remove nonpolar materials. Polar compounds were then eluted with 15 mL ethyl ether and 15 mL methanol. Other analyses were also conducted following AOCS methods (AOCS 1989). For example, conjugated diene value (CDV) was determined by AOCS method Ti 1a-64 with a W-64 Beckman ultraviolet photoelectric spectrophotometer from Beckman Instruments, San Ramon, Calif. by measuring the absorbance at 234 nm. Oxidative stability index (OSI) was measured by AOCS method Cd 12b-92 with an oxidative stability instrument from Omnion, Rockland, Mass. Viscosity (V) was measured by AOCS method Ja 10-87 with a RV Brookfield digital viscometer from Brookfield Engineering Laboratories, Inc. Sttoughton, Mass. and #1, #2, #3 standard spindles. Peroxide value (PV) was determined by AOCS method Cd 8-53. Color test was performed by dissolving 50% oil sample in isooctane, and the absorbance at 420 nm was measured (see Mancini-Filho et al. in article in J. Am. Oil Chem. Soc. 63, 1452–1456, 1986) with a Spectronic 20+ spectrophotometer from Fisher Scientific, Pittsburgh, Pa. Foodoil sensor (FOS) readings were taken with a NI-21B or NI-21C FOS oil quality analyzer from Northern Instrument Co., Lino Lakes, Minn.

The fatty acid compositions of both fresh and used frying oil samples were analyzed with a HP 5890 Series II gas chromatograph from Hewlett-Packard, Avondale, Pa. A DB-225 fused silica capillary column (30×0.25 mm inner diameter) from J&W Scientific, Folsom, Calif. and flame ionization (FID) were employed. The injector and detector temperatures were 250 and 260 degrees C., respectively. Helium was used as carrier gas with a total flow rate of 23 mL/minute. The isothermal analysis was carried out at 205 degrees C. for 15 minutes. The oil samples were each methylated with 3 mL of 6% HCL in methanol at 75 degrees C. for 2 hours before injection. The fatty acid methyl esters (FAME) were quantified with heptadecanoic acid (C17:0) ester as an internal standard.

The polar portion obtained from column chromatography (polar portion of TPC) was separated into polymers (POL), acylglycerols and low molecular weight compounds (LMW), and quantified using high performance size exclusion chromatography (HPSEC). The system consisted of a HP 1090 Win liquid chromatograph with a Vectra 486 computer from Hewlett-Packard, and a Sedex 45 evaporative light scattering detector from Richard Scientific, Novato, Calif. Two gel permeation columns available as Ultrasphere 1000 Angstroms, 30 cm×7.7 mm, from Beckman Instruments and Jordi-Gel DVB 500 Angstroms, 250 mm×10 mm, from Jordi Associates Inc., Bellingham, Wash. were connected in series. Tetrahydrofuran or chloroform served as a mobile phase with a flow rate of 1.0 mL/minute. The column temperature was held at 40 degrees C. A 15 mL of diluted oil sample was injected using the autoinjector.

Five percent of each adsorbent agent was added to 150 grams of oil sample at ambient temperature or after heating the oil sample to 150 degrees C., stirred for 5 minutes (stirring can be effected by magnetic stirrer, mechanical stirrer, or manual stirrer such as glass rod) followed by filtration through a #41 Whatman filter paper from Whatman International Ltd. Maidstone, England. The filtrate (treated oil) from this oil treatment and filtration test procedure was stored in a sealed vessel at 4 degrees C. after flushing with nitrogen. Each filter cake was weighed after the oil treatment and filtration test procedure.

Efficiency evaluation of the adsorbent agents was conducted in two steps. First, all of the adsorbent agents were employed in the oil treatment and filtration test procedure described above. The above temperatures (ambient and 150 degrees C.) were employed and above seven measurements, FFA, CDV, TPC, OSI, color, POL, and LMW, were obtained from the samples. For each adsorbent agent at each temperature, at least three replications of each test were performed, from which the averages and standard deviations were calculated.

The variance of each test method was analyzed using statistical analysis embodied in the SAS System for Windows software package, Release 6.11.TS040, SAS Institute, Inc. Cary, N.C. 1989–1996. Duncan's test was performed to determine the differences (SAS 1989–1996) at 0.05 significance level.

Powder mixtures of selected adsorbent agents were mixed or blended in a 1:1 or 1:1:1 ratio by weight for the binary and ternary mixtures set forth in Table 4 below. The binary and ternary adsorbent mixtures were employed in the oil treatment and filtration test procedure described above. The above temperatures were employed as well as the above seven measurements, FFA, CDV, TPC, OSI, color, POL, and LMW, were obtained from the samples. For each mixture, at each temperature, at least three replications of each test were performed, from which the averages and standard deviations were calculated. The variance of each test method was analyzed as described above and Duncan's multiple range test was performed to determine the differences at 0.05 significance level among the adsorbent mixtures.

Table 2 shows the baseline values of the fresh and used frying oils prior to the above treatment and filtration test procedure. The used frying oil had greater FFA, TPC, PV, FOS, POL, and OSI values than the fresh oil sample. The fatty acid profiles were essentially similar with minor losses of 18:2n−6 and 18:3n−3 in the used frying oil.

TABLE 2

BASELINE CHARACTERISTICS OF THE SAMPLES

| | Fresh oil (F531) | Used frying oil (S516) |
|---|---|---|
| FFA (%) | 0.04 ± 0.01 | 0.69 ± 0.03 |
| CDV (%) | 1.24 ± 0.18 | 1.30 ± 0.18 |
| TPC (%) | 4.1 ± 1.6 | 9.9 ± 2.2 |
| PV (meq/kg oil) | 1.27 ± 0.01 | 2.55 ± 0.16 |
| POL (%) | 0.04 ± 0.02 | 1.84 ± 0.99 |
| LMW (%) | 0.24 ± 0.11 | 0.31 ± 0.22 |
| OSI (h) | 20.55 ± 1.87 | 6.63 ± 1.02 |
| Color (Abs. @ 420 nm) | 0.07 ± 0.01 | 0.45 ± 0.03 |
| Viscosity (cP @ 25° C.) | 88.1 ± 0.8 | 89.9 ± 0.1 |
| FOS readings | 0.00 | 0.94 ± 0.06 |
| Fatty acid profile (wt. %) | | |
| 14:0 | 0.9 ± 0.6 | 0.7 ± 0.5 |
| 16:0 | 12.3 ± 0.7 | 13.4 ± 0. |
| 16:1 n − 7 | 0.2 ± 0.1 | 0.5 ± 0.1 |
| 18:0 | 4.4 ± 0.1 | 4.7 ± 0.2 |
| 18:1 n − 9 | 36.7 ± 1.2 | 37.9 ± 0.7 |
| 18:1 n − 7 | 4.5 ± 0.1 | 4.9 ± 0.9 |
| Unknown | 2.6 ± 0.1 | 2.3 ± 0.7 |
| 18:2 n − 4 | 35.3 ± 0.7 | 33.9 ± 0.7 |
| 18:3 n − 6 | 0.6 ± 0.4 | 1.0 ± 0.1 |
| 18:3 n − 3 | 2.9 ± 0.7 | 2.3 ± 0.1 |

Where: FFA = free fatty acids, CDV = conjugated diene value, TPC = total polar component, PV = peroxide value, POL = polymers, LMW = low molecular weight materials, OSI = Oxidative Stability Index, and FOS = Foodoil Sensor readings.

The used frying oil was subjected to each of the individual adsorbent agents of Table 3 and the adsorbent efficiency in oil recovery was compared between untreated used oil (designated S516) and fresh oil designated F5310, see Table 3.

TABLE 3

ADSORBENT SCREENING AND EFFECTS ON USED FRYING OIL RECOVERY PARAMETERS

| Treated oils with adsorbents | FFA[1] (%) | | CDV (%) | | TPC (%) | | OSI (h) | | Color (Abs. @ 420 nm) | | POL (%) | | LMW (%) | |
|---|---|---|---|---|---|---|---|---|---|---|---|---|---|---|
| F531[3]        | 0.04 ± 0.01 | f[2] | 1.13 ± 0.13 | a  | 4.6 ± 2.8  | b | 21.5 ± 1.3 | a   | 0.07 ± 0.01 | d | 0.04 ± 0.03 | a | 0.28 ± 0.17 | a |
| S516[3]        | 0.71 ± 0.03 | a    | 1.18 ± 0.10 | a  | 9.9 ± 3.3  | a | 6.7 ± 0.6  | def | 0.48 ± 0.01 | a | 1.9 ± 0.9   | a | 0.38 ± 0.27 | a |
| Silasorb       | 0.29 ± 0.10 | d    | 1.31 ± 0.31 | a  | 8.8 ± 1.3  | a | 6.0 ± 0.8  | ef  | 0.33 ± 0.02 | c | 1.0 ± 0.5   | a | 0.17 ± 0.04 | a |
| Britesorb      | 0.66 ± 0.01 | ab   | 1.13 ± 0.08 | a  | 9.0 ± 1.5  | a | 8.0 ± 2.0  | cd  | 0.33 ± 0.03 | c | 0.8 ± 0.6   | a | 0.21 ± 0.09 | a |
| Hubersorb 600  | 0.11 ± 0.03 | e    | 1.12 ± 0.09 | a  | 9.9 ± 2.0  | a | 8.5 ± 1.2  | bc  | 0.34 ± 0.01 | c | 1.6 ± 0.8   | a | 0.17 ± 0.01 | a |
| Calsilite      | 0.46 ± 0.06 | c    | 1.25 ± 0.08 | a  | 10.7 ± 1.9 | a | 3.9 ± 0.9  | g   | 0.42 ± 0.04 | b | 1.5 ± 0.7   | a | 0.17 ± 0.02 | a |
| Purifry        | 0.46 ± 0.02 | c    | 1.22 ± 0.13 | a  | 10.2 ± 1.6 | a | 5.7 ± 1.5  | f   | 0.44 ± 0.05 | b | 1.1 ± 0.7   | a | 0.24 ± 0.09 | a |
| Frypowder      | 0.74 ± 0.05 | a    | 1.34 ± 0.23 | a  | 8.1 ± 0.8  | a | 9.8 ± 0.8  | b   | 0.41 ± 0.02 | b | 1.2 ± 0.8   | a | 0.19 ± 0.03 | a |
| Activated Carbon | 0.68 ± 0.02 | ab | 1.23 ± 0.11 | a  | 8.3 ± 1.7  | a | 6.9 ± 1.2  | def | 0.43 ± 0.02 | b | 0.9 ± 0.9   | a | 0.16 ± 0.05 | a |
| Magnesol       | 0.43 ± 0.05 | c    | 1.18 ± 0.07 | a  | 9.6 ± 0.4  | a | 7.6 ± 1.5  | cde | 0.31 ± 0.02 | c | 1.0 ± 0.8   | a | 0.19 ± 0.10 | a |
| Sorbead AF     | 0.62 ± 0.11 | b    | 0.21 ± 0.12 | a  | 9.8 ± 1.5  | a | 6.4 ± 1.3  | def | 0.34 ± 0.01 | c | 1.0 ± 0.5   | a | 0.20 ± 0.05 | a |

[1]See Table 2 for abbreviations and Table 1 for adsorbent sources.
[2]Values in the same column with the same letter are not statistically different at 0.05 significance level.
[3]F531 = untreated fresh oil, and S516 = untreated used frying oil.

Since the temperature of the oil sample was found not to have a significant affect on adsorbent efficiency, the means of value under both ambient temperature and 150 degrees C. were statistically analyzed. From Table 3, it is apparent that adsorbent HB 600 (calcium silicate) was effective to remove FFA by 84.5% as well as significantly improve oxidative stability compared to the untreated used frying oil sample (e.g. OSI value of 8.5 hours versus 6.7 hours for untreated oil) and lightened color (e.g. 0.34 versus 0.48 for untreated oil). The HB 600 adsorbent agent exhibited a tiny particle size and amorphous nature to provide a very large surface area that may have contributed to observed high adsorption. The amount of retained oil by HB adsorbent agent (e.g. 475 mL/100 grams of adsorbent) was higher than the other adsorbent agents. Another calcium silicate adsorbent agent, Silasorb, showed high adsorption of FFA (e.g. 59.1%) that was lower than the HB adsorbent agent probably as a result of the larger particle size, different pH and different moisture content than those of HB adsorbent agent. Another calcium silicate adsorbent agent, Calsite, although having a similar composition and pH, adsorbed much less FFA than the HB 600 agent and the Silaborb agent. In terms of oil color improvement, the HB 600 adsorbent agent and Silasorb agent performed similarly, showing high adsorption of color compounds. The Silasorb agent, however, reduced the oil stability (e.g. 6.0 versus 6.7 hours). The Calsite agent was the least among the adsorbent agents in improving OSI values (e.g. 3.9 hours) and in color improvement.

The Britesorb agent and the Sorbead AF agent comprise aluminum silicate and, as a result, provide similar performance in oil regeneration. Both agents resulted in very little removal of FFA but both did provide oil color lightening. Britesorb agent removed more TPC than the HB 600 agent and improved oil stability, while the Sorbead AF agent reduced OSI values. Another adsorbent tested, Purify, also comprised aluminum silicate, but removed relatively more FFA, and less color compounds than Britesorb and Sorbead AF agents. The Frypowder agent comprised citric acid bearing porous rhyolite which was acidic due the citric acid component. The Frypowder agent elevated the acidity of the treated used oil samples. It removed the most amount of TPC, giving rise to the significantly higher OSI values than the other adsorbent agents tested. Activated carbon, a more neutral adsorbent agent tested, did little to improve FFA, OSI and color of the used frying oil samples. Among the seven test methods employed, CDV, TPC, POL and LMW gave significant values, indicating that they would not play a significant role as adsorbent properties.

From Table 4, it is apparent that the ternary mixtures, HB+Ma+Br and HB+Ma+Fr, pursuant to an embodiment of the invention significantly removed more FFA and color compounds from the used oil samples. Indeed, the FFA level was reduced significantly and unexpectedly to the level of FFA of the fresh frying oil. The binary mixture, HB+Ma, was significantly better in color lightening than the HB+Ma+Br ternary mixture of the invention, but exhibited insignificant FFA removal when compared to the ternary mixtures of the invention.

With respect to color improvement, the HB+Ma+Fr ternary mixture of the invention exhibited significantly and unexpectedly improved color lightening of the treated used frying oil as shown in Table 4, even though Frypowder agent alone did not yield much effect on color lightening. The HB+Ma+Fr ternary mixture significantly increased color recovery of the used frying oil by 40.5%. The HB+Ma binary mixture improved color recovery by 30.0% and 16.1% compared to HB 600 agent alone or Magnesol agent alone, respectively. However, the HB+Fr binary mixture increased color recovery by only 19%. The HB+Ma+Br ternary mixture of the invention was less effective (color improvement of 19.0%) in color lightening of the treated used frying oil as shown in Table 4.

The HB+Ma+Fr ternary absorbent mixture of the invention significantly reduced TPC content. The ternary mixtures, HB+Ma+Br and HB+Ma+Fr, pursuant to the invention significantly removed harmful polymers (POL) and low molecular weight compounds (LMW), improving POL and LMW removals from the used oil samples as shown in Table 4. The Frypowder agent and the HB+Br binary mixture significantly improved the OSI value of treated used frying oil.

TABLE 4

SELECTED ADSORBENT COMBINATION TREATMENT EFFECTS ON THE RECOVERY OF USED FRYING OILS

| Treated oils with adsorbents | FFA[1] (%) | | CDV (%) | | TPC (%) | | OSI (h) | | Color (Abs. @ 420 nm) | | POL (%) | | LMW (%) | |
|---|---|---|---|---|---|---|---|---|---|---|---|---|---|---|
| F531[1] | 0.04 ± 0.01 | h[3] | 1.41 ± 0.07 | a | 3.8 ± 0.3 | c | 19.8 ± 2.1 | a | 0.07 ± 0.01 | h | 0.03 ± 0.01 | a | 0.21 ± 0.07 | a |
| S516[1] | 0.67 ± 0.02 | b | 1.48 ± 0.05 | a | 9.8 ± 1.6 | ab | 6.6 ± 1.7 | d | 0.42 ± 0.01 | a | 1.8 ± 1.0 | a | 0.26 ± 0.10 | a |
| Br[2] | 0.64 ± 0.01 | c | 1.51 ± 0.03 | a | 9.3 ± 1.1 | ab | 6.7 ± 0.1 | d | 0.35 ± 0.01 | c | 1.2 ± 0.9 | a | 0.16 ± 0.02 | a |
| HB | 0.11 ± 0.02 | c | 1.49 ± 0.05 | a | 9.0 ± 1.5 | ab | 7.7 ± 0.6 | bcd | 0.37 ± 0.01 | b | 1.2 ± 0.5 | a | 0.15 ± 0.02 | a |
| Fr | 0.75 ± 0.01 | a | 1.39 ± 0.04 | a | 9.2 ± 1.4 | ab | 9.7 ± 0.8 | b | 0.42 ± 0.01 | a | 1.1 ± 1.0 | a | 0.12 ± 0.02 | a |
| Ma | 0.36 ± 0.02 | d | 1.51 ± 0.02 | a | 10.0 ± 1.8 | ab | 7.3 ± 1.0 | cd | 0.31 ± 0.01 | e | 1.2 ± 1.1 | a | 0.51 ± 0.05 | a |
| HB + Si | 0.08 ± 0.01 | f | 1.44 ± 0.01 | a | 9.3 ± 0.3 | ab | 8.0 ± 0.1 | bcd | ND[4] | | 1.3 ± 0.6 | a | 0.13 ± 0.01 | a |
| HB + Br | 0.08 ± 0.01 | f | 1.57 ± 0.16 | a | 9.3 ± 1.3 | ab | 9.1 ± 1.0 | bc | 0.32 ± 0.01 | e | 1.4 ± 0.6 | a | 0.18 ± 0.08 | a |
| HB + Fr | 0.07 ± 0.01 | f | 1.58 ± 0.23 | a | 11.4 ± 1.0 | a | 8.5 ± 0.9 | bcd | 0.34 ± 0.01 | d | 1.5 ± 0.1 | a | 0.14 ± 0.01 | a |
| HB + Ma | 0.06 ± 0.02 | fg | 1.46 ± 0.02 | a | 9.2 ± 2.0 | ab | 8.2 ± 1.0 | bcd | 0.26 ± 0.01 | f | 1.0 ± 0.6 | a | 0.12 ± 0.03 | a |
| HB + Ma + Br | 0.04 ± 0.01 | gh | 1.44 ± 0.03 | a | 8.6 ± 1.4 | ab | 8.1 ± 0.6 | bcd | 0.34 ± 0.01 | cd | 1.0 ± 0.6 | a | 0.11 ± 0.02 | a |
| HB + Ma + Fr | 0.05 ± 0.01 | gh | 1.40 ± 0.12 | a | 8.1 ± 1.3 | b | 8.1 ± 0.7 | bcd | 0.25 ± 0.01 | g | 1.0 ± 0.6 | a | 0.09 ± 0.03 | a |

[1]F531 = untreated fresh oil, and S516 = untreated used frying oil.
[2]Br = Britesorb, HB = Hubersorb 600, Fr = Frypowder, Si = Silasorb and Ma = Magnesol.
[3]Values in the same column with the same letter are not statistically different at 0.05 significance level.
[4]Not determined.

In summary, the ternary mixtures, HB+Ma+Br and HB+Ma+Fr, pursuant to the invention were surprisingly and unexpectedly effective in reducing FFA by 94.0% and 92.5%, reducing polar compounds by 12.2% and 17.3%, improving color by 19.0 and 40.5%, reducing polymers by 44.4% and 44.4%, reducing LMW by 57.7% and 65.4%, and improving oil stability by 22.7% and 22.7%, respectively.

The aforementioned ternary mixtures, HB+Ma+Br and HB+Ma+Fr, and binary mixture, HB+Ma, were subjected to further used oil recovery tests using additional used frying oil samples. Each adsorbent component of the HB+Ma+Br, HB+Ma+Fr, and HB+Ma was present in a concentration of 1 weight % of the oil sample treated.

One fresh oil sample and five used frying fats (designated S1, S2, S3, S4, S516) were obtained from a food local processor. The fresh fat was soybean oil like that described above refined by Cargill Inc. The used fats were taken from commercial fryers after frying chicken breast, pork chop shapes, and rib meat at 360 degrees with different coating ingredients. For example, the coating ingredient for oil samples S1, S2, and S516 was wheat flour, sugar, yellow corn flour, yeast, salt, caramel color and oleoresin paprika and fried continuously for 15 hours. Oil sample S4 was used to fry very spicy foods until acidity increased to 0.1%, while oil sample S3 was subjected to all kinds of food cooking intermittently over 10 days.

The analysis test methods used for FFA, CDV, etc. corresponded to those AOCS methods described above with the exception that color was determined in Hunter Coordinates (L, a, and b) using a CS-5 Chroma Sensor from Applied Colorsystems, Inc. Charlotte, N.C. and a 4.0 mL (10×10×45 mm) cuvet from Fisher Scientific.

The adsorbent mixtures were added to the used oil samples at 150 degrees C. since in commercial frying operations, the frying oil is treated immediately after a work shift or work day is completed while the oil is hot. Each mixture was stirred for 5 minutes followed by filtration through a #41 Whatman filter paper to constitute the treamtent and filtration test procedure. The filtrate (treated oil) was stored in a sealed vessel at 4 degrees C. after flushing with nitrogen after the procedure.

The efficiency of the adsorbent treatments was evaluated using above frying oil samples and five test methods; namely FFA, CDV, TPC, OSI and absorbance at 420 nm. The concentrations of each absorbent in each mixture tested was determined from 3 levels (1–3% by weight of oil treated) adopting Latin Square experimental design with two used oil samples. Then the oil sample was subjected to treatment with each mixture during a time course study from 0 to 15 minutes, and consequently treatment time was determined. Finally, the oil samples were treated using the selected mixtures at proper times followed by addition of 50 ppm by weight antioxidant; namely butylated hydroxytoluene (BHT) from Sigma Chemical Co. St. Louis. Mo. and propyl gallate (PG) also from Sigma Chemical Inc., introduced into the treated oil to improve oil stability index, OSI value, which is related to the resistance to oxidation and frying-life of recovered oils.

Data analysis was based on three replications of each adsorbent mixture as described above using SAS software and Duncan's multiple range test to determine the difference at 0.05 significance level.

From Table 5, oil samples S1, S3 and S516 had relatively high FFA, TPC and PV values. Sample S2 was high in CDV, and samples S3 and S4 exhibited high absorbance at 420 nm.

All oil samples gave a lower L value (lightness) and higher a and b values than fresh oil sample (designated F2), indicating that they were darker, more reddish, and yellowish as compared to the fresh oil sample. Frying with spicy ingredients gave rise to high viscosity of sample S4, suggesting that serious polymerization occurred in this sample. The low values of TPC and PV in sample S4 were probably due to the severe secondary degradation caused by overcooking.

TABLE 5

Sample Parameters

| Samples | Fresh 2 (F2[1]) | Used 1 (S1) | Used 2 (S2) | Used 3 (S3) | Used 4 (S4) | Used 5 (S516) |
|---|---|---|---|---|---|---|
| FFA[2] (%) | 0.06 ± 0.01 | 0.66 ± 0.02 | 0.20 ± 0.01 | 0.76 ± 0.09 | 0.32 ± 0.02 | 0.69 ± 0.03 |
| CDV (%) | 1.40 ± 0.05 | 1.66 ± 0.10 | 1.93 ± 0.12 | 1.73 ± 0.17 | 0.15 ± 0.03 | 1.30 ± 0.18 |
| TPC (%) | 4.0 ± 1.0 | 8.4 ± 0.5 | 5.9 ± 0.2 | 10.1 ± 1.0 | 2.5 ± 0.5 | 9.9 ± 2.2 |
| PV (meq/kg oil) | 1.38 ± 0.09 | 2.05 ± 0.06 | 1.57 ± 0.05 | 2.64 ± 0.04 | 1.06 ± 0.04 | 2.55 ± 0.16 |
| OSI (h) | 22.25 ± 11.54 | 7.67 ± 1.47 | 10.37 ± 2.02 | 9.63 ± 0.57 | NA[3] | 6.63 ± 1.02 |
| Absorbance @ 420 nm | 0.07 ± 0.01 | 0.36 ± 0.01 | 0.19 ± 0.01 | 0.87 ± 0.01 | 0.79 ± 0.06 | 0.45 ± 0.03 |
| Color (Hunter Coordinates) | | | | | | |
| L | 46.20 ± 0.12 | 41.61 ± 2.45 | 44.73 ± 0.91 | 36.06 ± 0.33 | 27.40 ± 0.12 | 41.26 ± 0.28 |
| a | −1.26 ± 0.02 | 0.91 ± 0.09 | −1.12 ± 0.05 | 5.70 ± 0.05 | 3.39 ± 0.07 | 1.06 ± 0.09 |
| b | 5.89 ± 0.07 | 14.14 ± 1.26 | 10.26 ± 0.02 | 14.80 ± 0.08 | 7.21 ± 0.06 | 13.97 ± 0.60 |
| FOS readings | 0.00 | 2.33 ± 0.53 | 0.66 ± 0.08 | 0.93 ± 0.05 | NA | 0.94 ± 0.06 |
| Viscosity (cP @ 25° C.) | 91.5 ± 0.3 | 102.1 ± 0.5 | 93.1 ± 0.6 | 89.7 ± 0.8 | 118.7 ± 0.1 | 89.9 ± 0.1 |
| Fatty acid profile (wt. %) | | | | | | |
| C16:0 | 14.4 ± 0.4 | 13.6 ± 1.3 | 13.3 ± 0.7 | 13.7 ± 1.1 | NA | 13.4 ± 0.9 |
| C16:1 n-7 | Trace | Trace | Trace | 0.6 ± 0.1 | NA | 0.5 ± 0.1 |
| C18:0 | 4.5 ± 0.2 | 4.5 ± 1.0 | 4.3 ± 0.8 | 3.0 ± 0.5 | NA | 4.7 ± 0.2 |
| C18:1 n-9 | 44.1 ± 0.2 | 42.6 ± 1.8 | 41.9 ± 1.7 | 44.9 ± 0.8 | NA | 37.9 ± 0.7 |
| Unknown | 1.6 ± 0.5 | 2.3 ± 0.5 | 2.7 ± 0.2 | 1.7 ± 0.9 | NA | 2.3 ± 0.7 |
| C18:2 n-6 | 32.9 ± 1.0 | 32.5 ± 0.7 | 34.0 ± 1.1 | 32.3 ± 0.5 | NA | 33.9 ± 0.7 |
| C18:3 n-6 | 0.3 ± 0.1 | 3.3 ± 1.9 | 1.2 ± 0.7 | 1.3 ± 0.5 | NA | 1.0 ± 0.1 |
| C18:3 n-3 | 2.4 ± 0.4 | 2.9 ± 0.8 | 2.7 ± 0.5 | 3.2 ± 0.7 | NA | 2.3 ± 0.1 |

[1]F2 is a fresh oil, while S1, S2, S3, S4 and S516 are the used frying oil.
[2]FFA = free fatty acids, CDV = conjugated diene value, TPC = total polar components, PV = peroxide value, OSI = oxidative stability index, and FOS = Foodoil Sensor.
[3]NA: Not applicable.

Referring to Table 6, generally, the acidity of all used oil samples was remarkably reduced by treatment with the binary and ternary adsorbent mixtures of the invention. Even though sample S2 was not severely abused, the sample had a FFA of 0.20% (Table 5) which was reduced by 25%–50% after the treatment pursuant to the invention. In terms of absorbance at 420 nm, the darker the color, the better the oil sample was recovered. For example, the color of sample S2 was not darkened very much, resulting in absorbance decrease from 0.19 to only 0.14–0.18. On the other hand, the absorbance of much darker samples S3 and S4 was regenerated to a high degree of 39–42% and 79–85%, respectively.

The efficiency of the absorbent mixtures were statistically compared in Table 7 where it is apparent that the improvement abilities of the treatments were inversely proportional to degrees of abuse of the used frying oil samples as indicated by the significantly high values for oil sample S4 and lowest values for oil sample S2.

TABLE 6

The Parameter of Four Recovered Used Frying Oils with Three Adsorbent Combinations

| Sample[2] | Filter Aid[1] | FFA (%) | CDV (%) | TPC (%) | OSI (h) | Absorbance (@ 420 nm) |
|---|---|---|---|---|---|---|
| S1 | 1 | 0.18 ± 0.02 | 1.73 ± 0.13 | 7.16 ± 0.94 | 7.3 ± 1.8 | 0.26 ± 0.01 |
|  | 2 | 0.13 ± 0.01 | 1.73 ± 0.26 | 7.06 ± 0.47 | 6.7 ± 1.3 | 0.26 ± 0.03 |
|  | 3 | 0.15 ± 0.03 | 1.77 ± 0.18 | 6.91 ± 0.52 | 7.0 ± 1.3 | 0.28 ± 0.05 |
| S2 | 1 | 0.15 ± 0.01 | 1.84 ± 0.11 | 5.74 ± 0.73 | 7.0 ± 1.9 | 0.18 ± 0.01 |
|  | 2 | 0.11 ± 0.02 | 1.67 ± 0.05 | 6.17 ± 0.95 | 6.8 ± 2.4 | 0.14 ± 0.01 |
|  | 3 | 0.10 ± 0.03 | 1.66 ± 0.15 | 6.01 ± 0.92 | 6.7 ± 3.0 | 0.14 ± 0.01 |
| S3 | 1 | 0.21 ± 0.08 | 1.57 ± 0.13 | 8.50 ± 1.11 | 7.9 ± 1.4 | 0.53 ± 0.01 |
|  | 2 | 0.12 ± 0.02 | 1.51 ± 0.11 | 8.49 ± 0.61 | 8.3 ± 1.4 | 0.51 ± 0.01 |
|  | 3 | 0.15 ± 0.04 | 1.56 ± 0.15 | 8.54 ± 0.44 | 7.9 ± 1.4 | 0.52 ± 0.01 |
| S4 | 1 | 0.03 ± 0.01 | 0.15 ± 0.04 | 2.65 ± 0.43 | NA | 0.12 ± 0.02 |
|  | 2 | 0.03 ± 0.01 | 0.10 ± 0.02 | 1.51 ± 0.70 | NA | 0.17 ± 0.02 |
|  | 3 | 0.03 ± 0.01 | 0.10 ± 0.02 | 1.81 ± 0.56 | NA | 0.13 ± 0.01 |

[1]Adsorbent combinations: 1 = HB + Ma, 2 = HB + Ma + Fr, 3 = HB + Ma + Br, where HB = Hubersorb 600, Ma = Magnesol, Fr = Frypowder and Br = Britesorb.
[2]S1, S2, S3 and S4 are used frying oils as in Table 5.
[3]NA: Not applicable.

TABLE 7

Summary of improvement Ability[1] (%) of Adsorbent Combinations

| Sample | FFA | CDV | TPC | OSI | Absorbance |
|---|---|---|---|---|---|
| S1 | 78.1 b[3] | 2.2 c | 15.8 a | −6.1 a | 25.5 c |
| S2 | 40.9 c | 4.4 bc | −2.1 b | −35.0 c | 19.7 d |
| S3 | 79.5 b | 10.3 b | 15.6 a | −16.4 b | 39.8 b |
| S4 | 89.8 a | 24.3 a | 17.1 a | NA[4] | 82.3 a |

| Filter Aid[2] | FFA | CDV | TPC | OSI | Absorbance |
|---|---|---|---|---|---|
| 1 | 65.5 b | 3.2 b | 5.8 a | −17.1 a | 39.8 a |
| 2 | 76.3 a | 14.2 a | 15.5 a | −19.9 a | 42.9 a |
| 3 | 74.4 a | 13.6 a | 13.6 a | −20.5 a | 42.8 a |

[1]The recovery efficiency of adsorbents on used frying oils were calcutated as follows with data on Table 1 and 2:

$$\text{Improvement \%} = \frac{\text{Value of untreated oil} - \text{Value of treated oil}}{\text{Value of untreated oil}} \times 100$$

For OSI, $$\text{Improvement \%} = \frac{\text{Value of treated oil} - \text{Value of untreated oil}}{\text{Value of untreated oil}} \times 100$$

[2]Adsorbent combinations: 1 = HB + Ma, 2 = HB + Ma + Fr, and 3 = HB + Ma + Br, where HB = Hubersorb 600, Ma = Magnesol, Fr = Frypowder, and Br = Britesorb.
[3]Values ln tne same column with the same letter are not statistically different at 0.05 significance level.
[4]NA: Not applicable. See Table 5 for other abbreviations.

With respect to the adsorbent mixtures, the binary combination, HB+Ma designated 1 in Table 7, significantly reduced FFA and CDV of the used oil samples, but at significantly lower levels than the reductions achieved by ternary mixtures designated 2 and 3 in Table 7. However, the improvement % values of OSI were always negative, indicating that treatment using the binary and ternary adsorbent mixtures did not improve oil stability.

Concentration of the adsorbent components in the ternary mixtures were evaluated between 1 to 3 weight % of the oil sample to be treated, and the results are set forth in Table 8.

For the adsorbent ternary mixture, HB+Ma+Fr, the concentrations of HB 600 and Magnesol were significant when reduction of both FFA and absorbance at 420 nm were taken into account. A 3% HB 600 concentration was consistently desirable for both the FFA and absorbance reduction. A 3% Magnesol was significantly efficient on the FFA removal, but was not significantly different from 2% Magnesol at 0.05 significance level when the absorbance values were considered. The concentrations of Frypowder (Fr) were significant only for FFA reduction but not at 2% and 3% concentrations. The FOS reduction was not significant in this case. Overall, 3% HB 600, 3% Magnesol, and 2% Frypowder (%'s are percent of oil to be treated) were desirable concentrations to recover the used frying oil samples.

For HB+MA+Br, 2% HB 600 was selected as desirable. Although 3% concentration removed more FFA than 2% HB 600, the 2% HB 600 significantly reduced more color compounds than the 3% concentration by a surprising and unexpected 138%. A 3% Magnesol concentration was selected due to its improvement in removal of FFA and reduction of absorbance. The highest improvement in FOS was just 3.27%. Britesorb concentrations were not significant in FFA removal, but 2% thereof was significant on reduction of both absorbance and FOS. Overall, 2% HB, 3% Magnesol, and 2% Britesorb (%'s are percent of oil to be treated) were selected for the further testing of the HB+Ma+Br ternary adsorbent mixture to be described below.

To determine the optimum treatment time, the above preferred ternary mixtures were used to treat used frying oils (S1 and S3) at 150 degrees C. for 15 minutes with sampling every 3 minutes and averages reported.

For the 3% HB 600-3% Magnesol-2% Frypowder mixture designated F in Table 9, FFA decreased continuously over time with statistical analysis indicating the FFA reduction was significant at 3 minutes. A 6–15 minute treatment time with mixture F thus can be used to reduce FFA in used frying oils. The absorbance at 420 nm dropped initially and kept decreasing slightly until 12 minutes followed by an increase. Therefore, a 6–9 minute treatment was preferred for absorbance reduction. The FOS reading was reduced initially and reached the lowest point at about 6 minutes followed by a significant elevation thereafter. It was concluded that 6 minutes was the optimum time to remove the adsorbent mixture F from the used frying oil.

TABLE 8

Concentration Test[1] for Two Adsorbent Combinations[2]

| Conc. (%) | FFA | | | Absorbance | | | FOS | | |
|---|---|---|---|---|---|---|---|---|---|
| | HB | Ma | Fr | HB | Ma | Fr | HB | Ma | Fr |
| 1 | 52.5 c[3] | 55.4 c | 59.5 b | 7.0 c | 6.0 b | 11.1 a | 1.29 a | 0.94 a | −0.50 a |
| 2 | 61.0 b | 61.7 b | 62.2 a | 11.7 b | 14.1 a | 11.4 a | −0.38 a | 0.53 a | −0.09 a |
| 3 | 72.4 a | 68.8 a | 64.2 a | 17.5 a | 15.9 a | 13.8 a | 0.57 a | 0.11 a | 2.06 a |
| | HB | Ma | Br | HB | Ma | Br | HB | Ma | Br |
| 1 | 58.4 c | 59.3 c | 67.4 a | 17.2 a | −0.2 b | 8.1 b | −0.53 a | 3.27 a | 3.78 a |
| 2 | 68.9 b | 67.9 b | 67.9 a | 16.9 a | 18.2 a | 17.8 a | −1.01 a | 1.14 ab | −1.52 ab |
| 3 | 74.4 a | 74.5 a | 66.4 a | 7.1 b | 23.3 a | 15.4 ab | 3.26 a | −2.69 b | −1.55 b |

[1]All data were converted into improvement % calculated same as in Table 7
[2]Two adsorbent combinations were HB + Ma + Fr and HB + Ma + Br. See Table 1 for abbreviations.
[3]Values in the same column with the same letter are not statistically different at 0.05 significance level.

TABLE 9

Treatment Duration Test[1] for Two Selected Adsorbent Combinations[2]

| Time | Combination F | | | | | Combination B | | | | | |
|---|---|---|---|---|---|---|---|---|---|---|---|
| (min.) | FFA | | Absorbance | | FOS | | FFA | | Absorbance | | FOS | |
| 3 | 78.5 ± 4.7 | b[3] | 29.2 ± 2.9 | bc | −2.1 ± 7.2 | b | 77.5 ± 1.2 | b | 29.9 ± 0.3 | a | 4.8 ± 3.2 | a |
| 6 | 87.6 ± 0.6 | a | 32.6 ± 1.1 | a | 8.6 ± 9.4 | a | 82.6 ± 1.7 | a | 26.8 ± 1.0 | b | 5.6 ± 1.8 | a |
| 9 | 88.7 ± 1.4 | a | 32.0 ± 1.8 | a | −3.0 ± 7.1 | b | 79.1 ± 1.1 | b | 22.7 ± 0.7 | c | 6.6 ± 3.4 | a |
| 12 | 89.4 ± 1.2 | a | 31.8 ± 2.6 | ab | −13.8 ± 6.0 | c | 77.3 ± 1.8 | b | 21.8 ± 0.3 | d | 7.7 ± 3.2 | a |
| 15 | 89.7 ± 0.7 | a | 28.2 ± 2.8 | c | −11.2 ± 8.1 | bc | 77.3 ± 1.1 | b | 20.2 ± 0.3 | e | 9.4 ± 4.3 | a |

[1]All data were converted into improvement % calculated as in Table 7
[2]Adsorbent combinations were: F = 3% HB + 3% Ma + 2% Fr, and B = 2% HB + 3% Ma + 2% Br.
See Table 1 for abbreviations.
[3]Values in the same column with the same letter are not statistically different at 0.05 significance level.

The treatment duration for 2% HB 600-3% Magnesol-2% Britesorb mixture designated B in Table 9 was similarly determined. Again, 6 minutes was the desired treatment time for acceptable FFA content and FOS values. However, 3 minutes gave greater improvement in absorbance than a 6 minute treatment time, Table 9, and was significantly better than a 9–15 minute duration. A 3–6 minute treatment duration with mixture B can be used in treatment of used frying oil.

Figure 2:
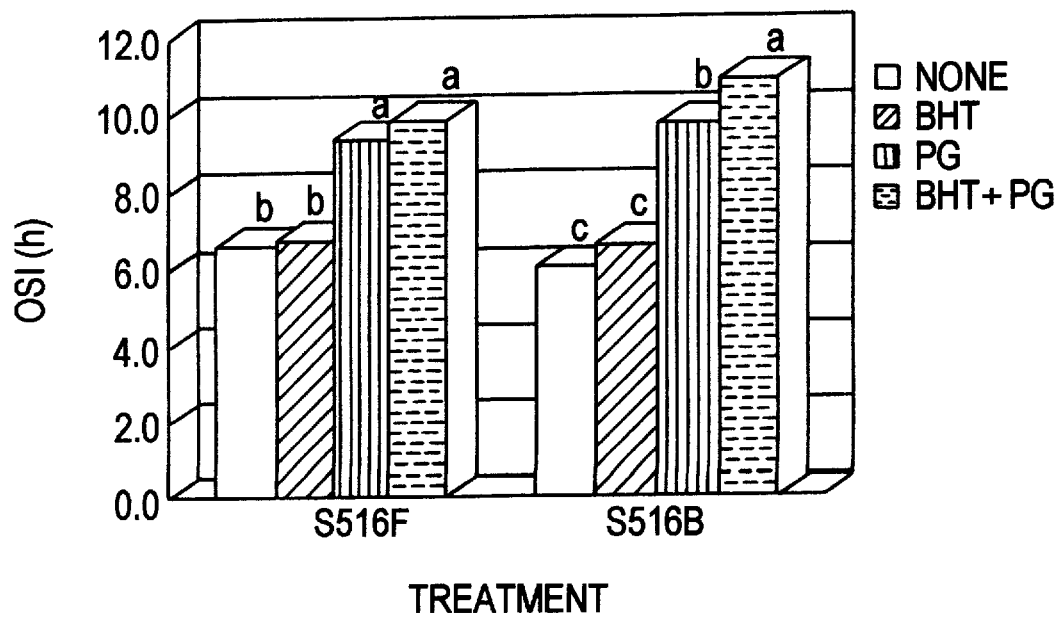
FIG. 2 is a bar graph showing the effects on OSI value of treatment of used frying oil with adsorbent mixtures F and B with and without antioxidants, BHT and PG.

Butylated hydroxytoluene (BHT) was used to improve stability of treated used oil samples. A concentration of 50 ppm by weight of BHT was used in oil samples treated with mixtures F and B discussed above. As shown in FIG. 1, the addition of BHT extended the OSI values of treated used oil samples (aforesaid oil samples S1 and S3) by 0–32.8% and 12.7–41.4% with mixtures F and B, respectively. Thus, antioxidants can be added pursuant to the invention to treated used frying oils to extend the shelf life thereof. Statistical analysis confirmed that the efficiency of BHT was significant regardless of the oil source and adsorbent mixture used. In comparison to propyl gallate (PG), the BHT was less effective in improving OSI values as illustrated in FIG. 2. The addition of 50 ppm by weight BHT and 50 ppm by weight PG together pursuant to the invention to the treated oil samples surprisingly and unexpectedly significantly increased OSI value more than BHT or PG alone. The oil stability values thereby were improved by 48.9 and 80.8%, respectively, for treated used frying oil (S516) by adsorbent mixtures F and B, respectively.

The efficiency of the above ternary adsorbent mixtures, 3% HB 600-3% Magnesol-2% Frypowder designated F and 2% HB 600-3% Magnesol-2% Britesorb designated B, was further evaluated by refrying in treated used oils.

The used frying oils included one fresh frying fat (designated F2) and a used frying fat (S516) were obtained from a local food processor. The fresh fat was the same soybean oil as described above refined by Cargill Inc. The used fats were taken from commercial fryers after frying chicken breast, pork chop shapes, and rib meat at 360 degrees with a coating ingredient. The coating ingredient included wheat flour, sugar, yellow corn flour, yeast, salt, caramel color and oleoresin paprika.

The used frying oils also included buffalo seasoned chicken tender fritters frying oil containing a 21% solution of seasoning (red peppers, vinegar, salt, and garlic) salt, spices, modified corn starch, sodium phosphates, modified cream, shortening powder, dehydrated butter, and other ingredients and flavoring. The meat was breaded, battered and predusted into about 1.4 oz. for each piece, with wheat flour, water, salt, spices, dried egg white, yellow corn fluor, artificial flavor, yeast, and extracts of paprika in soybean oil. Chicken breast with rib meat fritters frying oil contained 18% solution of salt, modified food starch, sodium phosphate, and flavorings. The meat pieces weighed 4.5 oz. and were breaded, battered, and predusted with enriched bleached wheat flour, modified corn starch, salt, spices, sugar, extracts of paprika, in soybean oil.

The analysis test methods used for FFA, CDV, etc. corresponded to those AOCS methods described above.

The adsorbent mixtures F and B each were added to respective used oil samples (3000 grams) at 150 degrees C., stirred for 6–9 minutes for mixture F and 3–6 minutes for mixture B followed by vacuum filtration through a #41 Whatman filter paper. Next, 50 ppm by weight BHT and 50 ppm by weight PG were added to the filtrate. The filtrate was stored in a sealed vessel at 4 degrees C. after flushing with nitrogen.

To evaluate efficiency of the adsorbent treatment on used oil recovery, the treated used oil samples were used to perform continuous frying. Approximately 200 grams of each treated used oil was subjected to three pieces of seasoned chicken fritters every 30 minutes during an 8 hour day for 4 days. A total of 16.3 pounds of meat were fried in a single oil with a Model 23016 Chef's Pot Stockor from Dazey Co., New Century, Kans. Each batch was fried for 5–7 minutes at 170–177 degrees C. according to Russell in Savory Coatings (D. B. Fuller and R. T. Parry ed.) Elsevier Applied Science, New York, N.Y. 1987, pp. 47–65. The frying oil and fried food were sampled every 2 hours. The oil was filtered with a filter paper, and the FFA, color, and FOS values were measured. The color of he food samples was also measured with the CS-5 Chroma Sensor from Applied Colorsystems, Inc. Charlotte, N.C.

The frying operation in fresh oil (F2) and untreated used oil (S516) also was performed as well to compare the effect of adsorbent treatment. Further, the adsorbent treatment was performed on a daily basis (1) with a replenishment with 15% fresh oil. Starting with the same fresh oil, the efficiency of adsorbent mixture F was compared to filtration without adsorbent treatment. In addition, to the seasoned chicken fritter, one piece of the chicken breast was fried every half hour for 7 minutes at 170–185 degrees C. Consequently, about 16.3 pounds of seasoned chicken and 18 pounds of chicken breast were fried in each oil sample. The frying oil and fried food samples were taken every 2 hours, and the FFA, color, and FOS values were measured. Data analysis was based on three replications of each adsorbent mixture as described above.

From Table 10, used oil sample S516 had a relatively high FFA, PV, and FOS values and a very low OSI value, Table 10, indicating oxidation occurred in the sample. The L value decreased in S516 while the a and b values increased, suggesting darkened color with more red and yellow compared to the fresh oil.

Figure 3A:
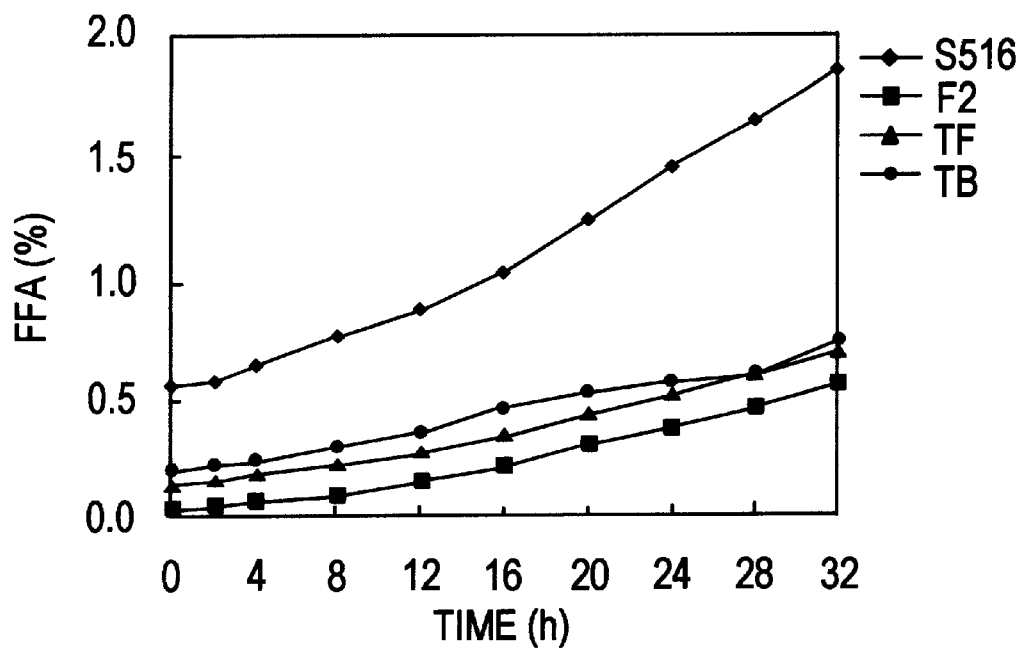
FIG. 3a is a graph of changes in FFA with time for fresh oil, untreated used frying oil, TF treated used frying oil, and TB treated used frying oil.

The quality parameters of both the treated oils, TF treated oil (treated with adsorbent mixture F) and TB treated oil (treated with adsorbent mixture B) were always between the fresh oil (F2) and untreated used oil (S516), FIG. 3a, and much closer to the quality parameters of the fresh oil.

The FFA value of S516 used oil started from 0.6% and reached 1.0%, which is the well known discard point, within 15 hours, and exceeded 1.5% after 25 hours of continuous frying. Deterioration of S516 used oil accelerated after 15 hours. On the other hand, the adsorbent TF and TB treated oils removed FFA by 78.3 and 68.1%, respectively, Table 10, giving the treated oil a much lower FFA.

Moreover, the treatment reduced the rate of FFA buildup, giving rise to a surprising and unexpected almost parallel increase of FFA with fresh oil, FIG. 3a. After 32 hours of refrying, the acidity of the TF and TB treated oils was 0.70 and 0.74%, respectively which were slightly higher than the beginning FFA value of S516 (0.6%). Therefore, the frying life of treated oils was extended approximately 38% from FFA standpoint.

phosphate, and water components in fried foods could be the reasons for severe increases in acidity.

Owing to the involvement of spicy seasonings, the color of frying oils changed very rapidly, though the adsorbent treatment recovered oil lightness (L value) by differences of 1.83 and 1.87, and "a" value by 1.54 and 1.62 for TF and TB treated oils, respectively, Table 10. Generally, the decreases in L values were parallel to each other, FIG. 3c, with the treated oil values being between those of fresh oil (F2) and untreated used oil (S516). Such darkening may be caused by the scorched food bits, leading to the accelerated decrease even in fresh oil. The products of Maillard reaction from the interactions of ingredients and food nutrients, such as sugar and amino acids also may have attributed to the darkening of oil color.

The "a" value which represents the degree of redness increased very fast at the beginning of frying in S516 oil, whereas a slight elevation was observed during the first 10 hours in fresh oil F2. After 23 hours of refrying, the "a" value of both treated and untreated oils reached similar maximal point where the used oil had been idling for 5 hours and then began to decease. Later, the "a" value of S516 used oil dropped sharply while that of the treated oils decreased slightly, especially for the TF treated oil. The decreases in

TABLE 10

The Parameters of Fresh Oil, Untreated Used Oil and Treated Used Oils

| Samples | Fresh oil (F2) | Used oil (S516) | Treated oil[1] (TF) | Treated oil[1] (TB) |
|---|---|---|---|---|
| FFA[2] (%) | 0.06 ± 0.01 | 0.69 ± 0.03 | 0.15 ± 0.01 | 0.22 ± 0.03 |
| TPC (%) | 4.0 ± 1.0 | 9.9 ± 2.2 | 4.3 ± 1.5 | 3.9 ± 1.9 |
| PV (meq/kg oil) | 1.38 ± 0.09 | 2.55 ± 0.16 | 1.27 ± 0.01 | 1.26 ± 0.01 |
| OSI (h) | 22.25 ± 1.54 | 6.63 ± 1.02 | 6.58 ± 0.49 | 6.00 ± 0.74 |
| Color (Hunter Coordinates) | | | | |
| L | 46.20 ± 0.12 | 41.26 ± 0.28 | 43.13 ± 0.71 | 43.09 ± 0.29 |
| a | −1.26 ± 0.02 | 1.06 ± 0.09 | −0.56 ± 0.05 | −0.48 ± 0.07 |
| b | 5.89 ± 0.07 | 13.97 ± 0.60 | 13.75 ± 0.70 | 13.24 ± 0.44 |
| FOS readings | 0.00 | 0.94 ± 0.06 | 0.93 ± 0.02 | 0.89 ± 0.02 |
| Viscosity (cP @ 25° C.) | 91.5 ± 0.5 | 89.9 ± 0.1 | 109.0 ± 0.7 | 97.2 ± 1.0 |

[1]TF and TB are treated used oil (S516) by adsorbent combinations, F (3% Hubersorb 600 + 3% Magnesol + 2% Frypowder) and B (2% Hubersorb 600 + 3% Magnesol + 2% Britesorb), respectively.
[2]FFA = free fatty acids, PV = peroxide value, OSI = oxidative stability index, and FOS = Foodoil Sensor.

Figure 3B:
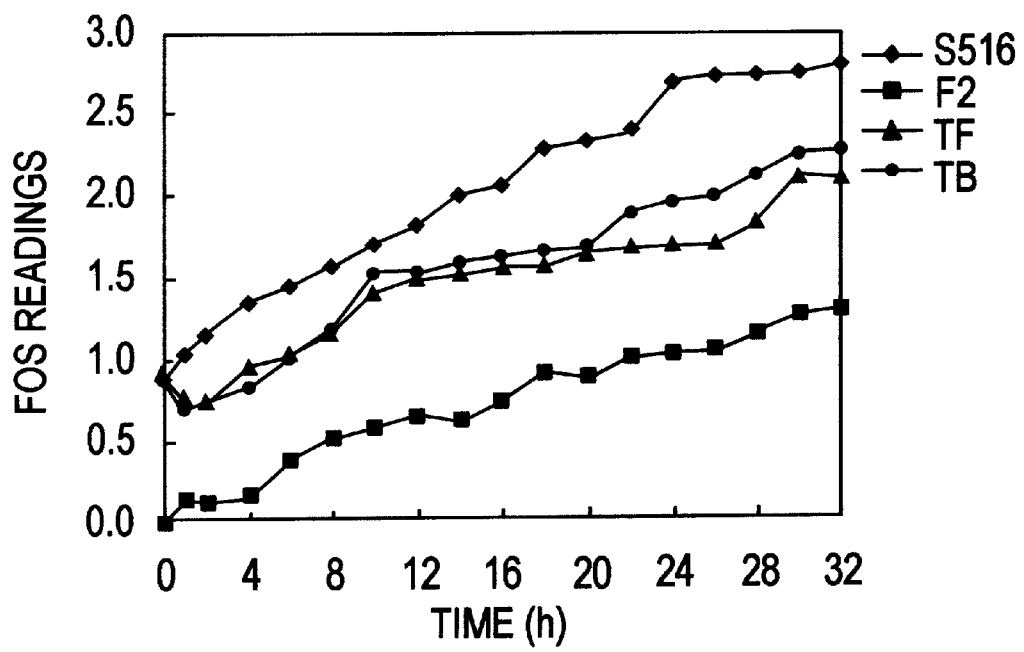
FIG. 3b is a graph of changes in FOS with time for fresh oil, untreated used frying oil, TF treated used frying oil, and TB treated used frying oil.
Figure 3C:
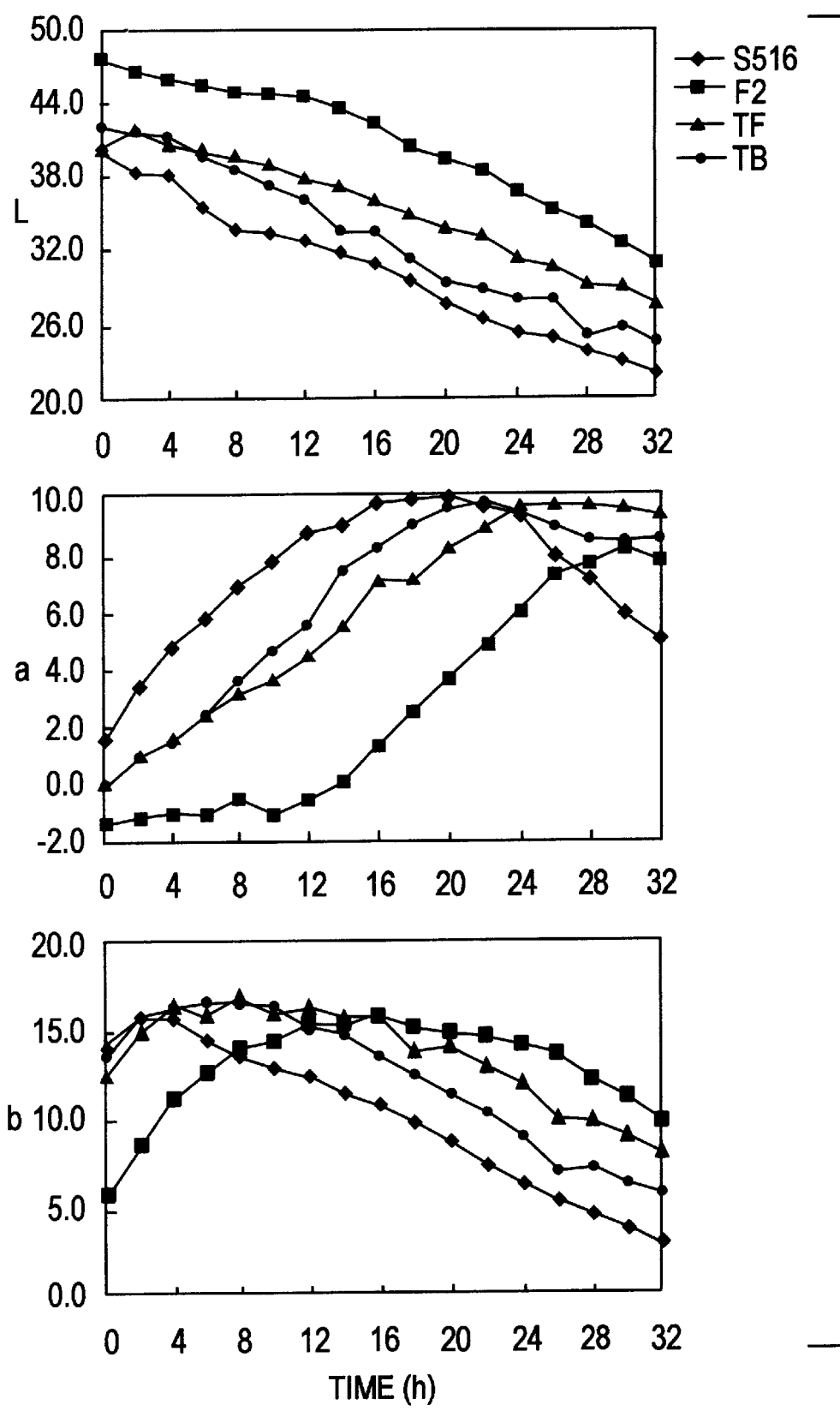
FIG. 3c is a graph of changes in color parameters, L, A, and B, with time for fresh oil, untreated used frying oil, TF treated used frying oil, and TB treated used frying oil.

In terms of FOS readings, FIG. 3b, the quality parameter was gradually elevated over time during frying in all four oil samples. The increase for S516 used oil was faster than for the fresh oil (F2), with an initial difference of 0.86, but up to 1.5 at the end of 32 hours frying operation. Although the adsorbent treatment did not instantly reduce dielectric constant changes in treated oils by much, the FOS value increased at a slower speed during refrying than the untreated used oil, resulting in less changes in FOS. For example, 0.70 and 0.54 were observed in TF and TB treated oils, respectively. Such changes again approximately parallel the changes in fresh oil (F2). The sharp drop in FOS readings during the first 1 hour of cooking was probably due to the escape of volatiles, including short chain FFA and polar compounds assisted by the presence of heat and water. The eventual reading of S516 used oil did not reach 3.0 after 32 hours of refrying, but the FFA values were far beyond a safety range of 1.0–1.5%. The spices, vinegar, salt, sodium the "a" value were probably caused by the reddish compounds of red pepper and paprika extracts formed during frying for such long duration. The yellow color represented by the "b" value showed inverse values to redness, though dependent on each other.

The "b" value increased first and decreased before long. Both increases and decreases of S516 used oil were greater than the other three oils, suggesting development of yellow color during the initial period of frying, but darkened with appearance of burned food bits. The two TF and TB treated oils performed similarly to S516 used oil during the first 4 hours, but decreased about 6 hours later than S516 at a significantly faster rate in treated oil TB. From the overall color difference point of view, Table 11, the development of color in fresh oil F2 was much faster than in other oils. The changes in both treated and untreated used oils were similar, but significantly increased along the time span of refrying.

TABLE 11

Changes in Overall Color Differences[1] In Fresh Oil, Untreated Used Oil and Treated Used Oil During Frying for 32 Hours

| | Used oil | | Fresh oil | | Treated oil[2] | | | |
|---|---|---|---|---|---|---|---|---|
| Time (h) | S516 | | F2 | | TF | | TB | |
| 0 | 16.60 ± 0.62 | i[3] | 6.62 ± 0.46 | l | 14.83 ± 0.16 | i | 15.16 ± 0.41 | j |
| 2 | 19.05 ± 0.46 | h | 9.31 ± 0.04 | k | 16.59 ± 0.36 | h | 17.46 ± 0.19 | i |
| 4 | 19.43 ± 0.52 | h | 11.86 ± 0.15 | j | 18.46 ± 0.21 | g | 18.10 ± 0.07 | hi |
| 6 | 20.72 ± 0.59 | g | 13.29 ± 0.54 | i | 18.26 ± 0.55 | g | 19.02 ± 0.14 | gh |
| 8 | 21.04 ± 0.55 | fg | 14.72 ± 0.32 | h | 19.64 ± 0.36 | ef | 19.69 ± 0.23 | fg |
| 10 | 21.08 ± 0.46 | fg | 15.20 ± 0.64 | h | 18.97 ± 0.92 | fg | 20.38 ± 0.29 | f |
| 12 | 21.66 ± 0.45 | efg | 16.22 ± 1.07 | g | 19.99 ± 0.35 | e | 20.25 ± 0.03 | f |
| 14 | 21.89 ± 0.39 | ef | 16.32 ± 0.04 | g | 20.13 ± 0.70 | e | 22.19 ± 0.07 | de |
| 16 | 22.58 ± 0.64 | de | 17.24 ± 0.29 | f | 21.24 ± 0.46 | cd | 21.62 ± 0.45 | e |
| 18 | 23.22 ± 0.41 | d | 17.40 ± 0.09 | f | 20.51 ± 0.43 | de | 22.82 ± 0.09 | d |
| 20 | 24.21 ± 0.20 | c | 17.76 ± 0.11 | ef | 21.83 ± 0.19 | c | 23.91 ± 1.36 | c |
| 22 | 24.61 ± 0.29 | bc | 18.37 ± 0.10 | e | 21.80 ± 0.90 | c | 23.90 ± 0.33 | c |
| 24 | 25.20 ± 0.71 | bc | 19.25 ± 0.20 | d | 22.87 ± 0.24 | ab | 23.85 ± 0.33 | c |
| 26 | 24.74 ± 0.38 | bc | 20.22 ± 0.91 | bc | 21.96 ± 0.09 | bc | 22.70 ± 0.38 | d |
| 28 | 25.37 ± 1.01 | ab | 20.11 ± 0.17 | c | 23.43 ± 0.73 | a | 25.70 ± 0.47 | a |
| 30 | 25.65 ± 0.90 | ab | 20.94 ± 0.55 | ab | 23.14 ± 1.11 | a | 24.51 ± 1.60 | bc |
| 32 | 26.31 ± 0.86 | a | 21.44 ± 0.36 | a | 23.85 ± 0.30 | a | 25.40 ± 0.34 | ab |

[1]Overall color differences, δE is the square root of the sum of the squares of differences in axis, L, a and b.
[2]TF and TB are treated used oils as in Table 10
[3]Values in the same column with same letter are not statistically different at 0.05 significance level.

Figure 4:
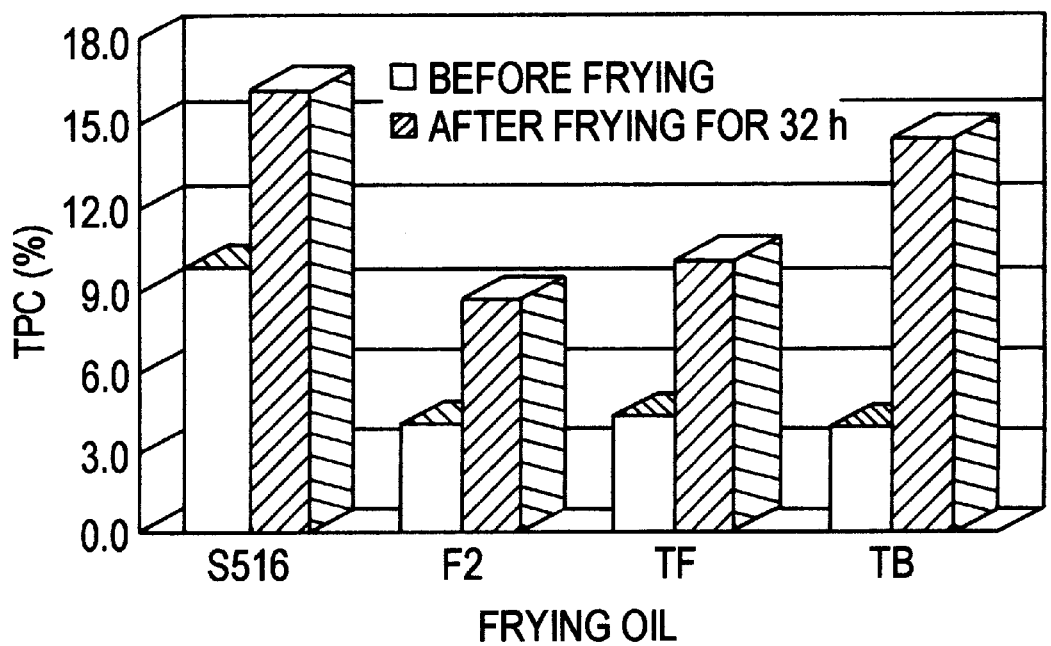
FIG. 4 is a bar graph of changes in TPC for fresh oil, untreated used frying oil, TF treated used frying oil, and TB treated used frying oil.

In addition, the ultimate concentration of total polar component (TPC) after frying was much lower in the treated used oils than in the untreated used oil, FIG. 4. TF and TB treated oils accumulated less final TPC by 38.0 and 11.3%, respectively. The treatment with adsorbent mixture F showed better controlling ability on TPC, giving rise to the lower increase of TPC, 5.8%, similar to the increase of 4.7% in fresh oil F2 and 6.3% in used untreated oil S516. However, the accumulation rate in the TB treated oil was faster (10.5%) than in the fresh oil and untreated used oil S516, although started at similar concentrations.

Comparing the two treated oils of the invention, the TF treated oil always performed better than the TB treated oil. Such differences were significant at 0.05 significance level in the test for FFA. FOS, L and b values, and TPC.

Figure 5A:
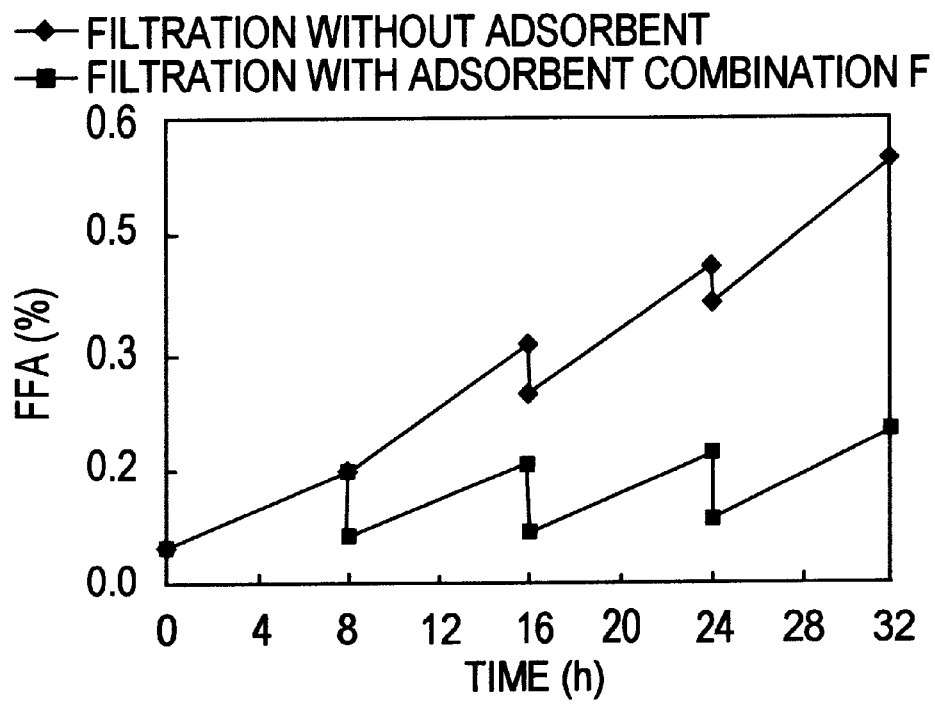
FIG. 5a is is a graph of changes in FFA with time with filtration with adsorbent treatment using adsorbent mixture F and without any treatment.
Figure 5B:
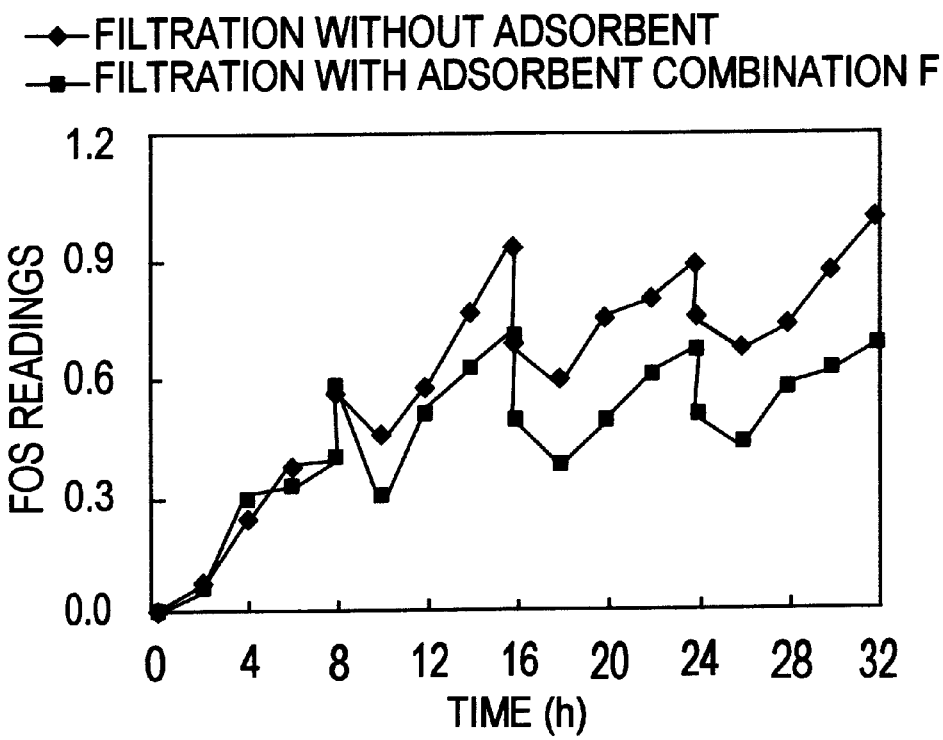
FIG. 5b is is a graph of changes in FOS with time with filtration with adsorbent mixture F and without any treatment.
Figure 5C:
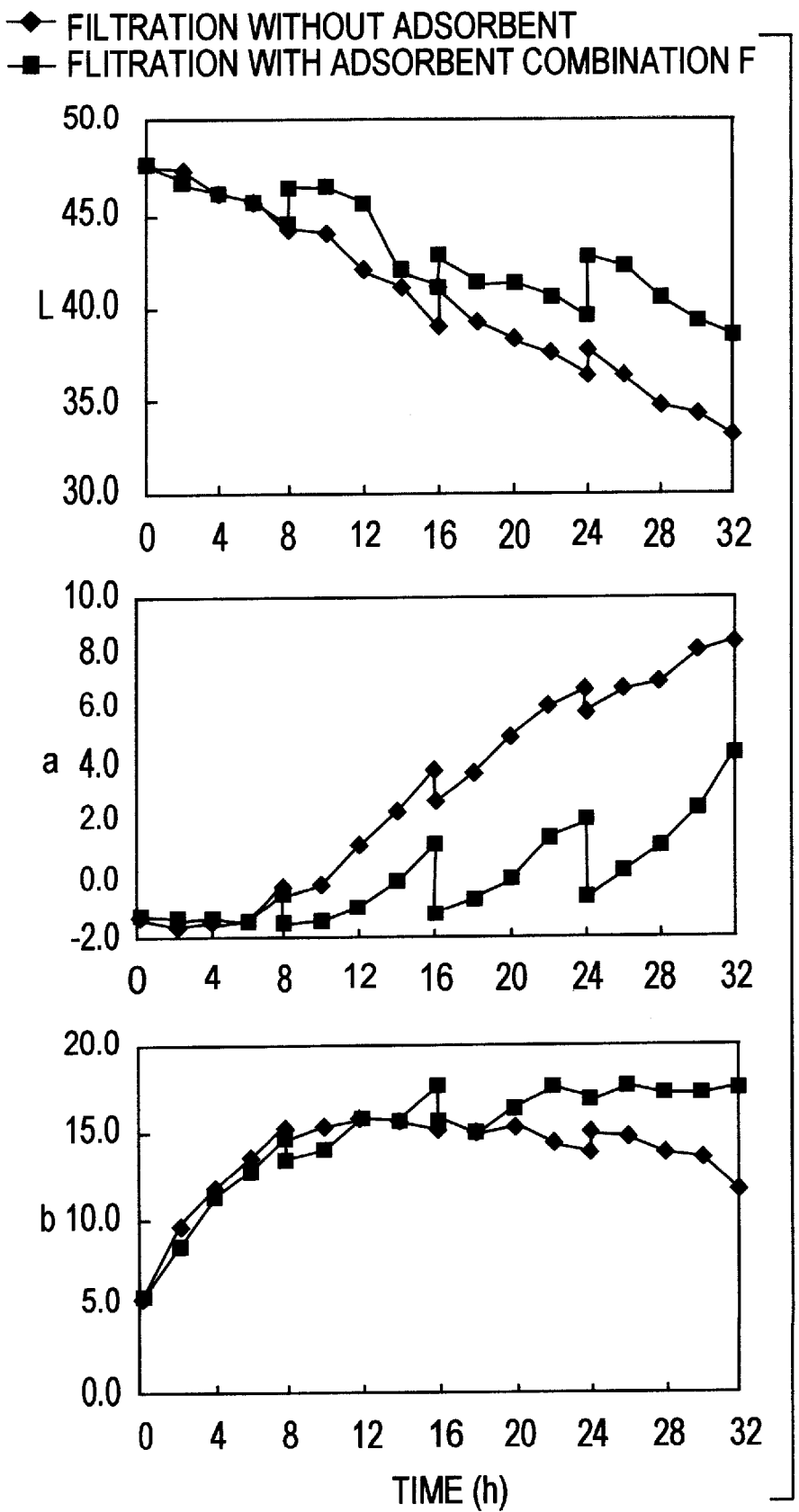
FIG. 5c is a graph of changes in color parameters, L, A, and B, with time with filtration with adsorbent mixture F and without any treatment.

The effect of frying with daily adsorbent treatment with a replenishment with 15% fresh oil was evaluated and indicated that filtration, replenishment and antioxidant addition improved the oil quality to some degree and slowed the deterioration, FIG. 5a, 5b, 5c. At the end of each day, the FFA level, FOS reading, and color parameters were improved due to the effect of dilution and removal of charcoal particles. However, by the end of 32 frying without adsorbent treatment, all the quality indexes reached similar levels as in the previous tests without fresh oil replenishment.

Contrary to filtration without the adsorbent treatment, the daily treatment with adsorbent mixture F not only removed more FFA each time of treatment, but also controlled the FFA buildup to a very low rate and kept the level of FFA below 0.19% at the end of 32 hours frying, FIG. 5a. Although the FOS reading probably owed its daily reduction to filtration and replenishment, the FOS value remained at a significantly lower level after the first 8 hours of treatment, FIG. 5b. Similar to the reduction of FFA, the color parameters L, a and b were recovered more at the end of each day, and the increasing rate was significantly slowed, FIG. 5c. As shown in Table 12, the filtration without adsorbent did not significantly change the color differences at each time of turnover, such 8, 16, and 24 hours, even though the oil was diluted with 15% fresh oil. However, when treated with adsorbent, the changes in color differences were significant and ended with a lower value of 23.46 at 32 hours. Overall, the oil treatment with selected mixture F and B did not lead to greater deterioration compared to the untreated control oil samples after 24 hours of frying.

TABLE 12

Changes of Overall Color Differences[1] in Oils during 32 h Frying With and Without Treatment With Adsorbent Combination

| Time (h) | No adsorbent | Treated by adsorbent combination F[2] |
|---|---|---|
| 0 | 7.92 ± 0.32 l[3] | 7.92 ± 0.32 l |
| 2 | 11.64 ± 0.01 k | 10.91 ± 0.12 k |
| 4 | 14.13 ± 0.07 j | 13.78 ± 0.02 j |
| 6 | 15.86 ± 0.07 i | 15.17 ± 0.17 i |
| 8 | 18.00 ± 0.11 h | 17.52 ± 0.31 g |
| 8'[4] | 17.27 ± 0.08 h | 15.41 ± 0.13 i |
| 10 | 18.12 ± 0.02 h | 15.94 ± 0.01 h |
| 12 | 19.58 ± 0.16 g | 17.93 ± 0.74 g |
| 14 | 20.13 ± 0.04 fg | 19.49 ± 0.18 ef |
| 16 | 21.17 ± 0.16 e | 21.70 ± 0.28 c |
| 16' | 20.46 ± 0.08 efg | 19.05 ± 0.15 f |
| 18 | 20.89 ± 0.06 ef | 19.27 ± 0.05 f |
| 20 | 22.08 ± 0.96 d | 20.53 ± 0.20 d |
| 22 | 22.14 ± 0.02 d | 21.94 ± 0.35 bc |
| 24 | 22.84 ± 0.29 cd | 22.06 ± 0.15 bc |
| 24' | 22.37 ± 0.38 d | 19.90 ± 0.23 e |
| 26 | 23.47 ± 1.06 bc | 20.99 ± 0.75 d |
| 28 | 24.06 ± 1.42 ab | 21.62 ± 0.22 c |
| 30 | 24.57 ± 0.94 a | 22.42 ± 0.21 b |
| 32 | 24.54 ± 0.71 a | 23.46 ± 0.18 a |

[1]Overall color differences, δE is the square root of the sum squares or L, a and b.
[2]Adsorbent combination F is 3% Hubersorb 600 + 3% Magnesol + 2% Frypowder.
[3]Values in the same column with same letter are not statistically different at 0.05 significance level
[4]The prime represent the measurement after treatment and overnight storage with nitrogen flushing.

Figure 6:
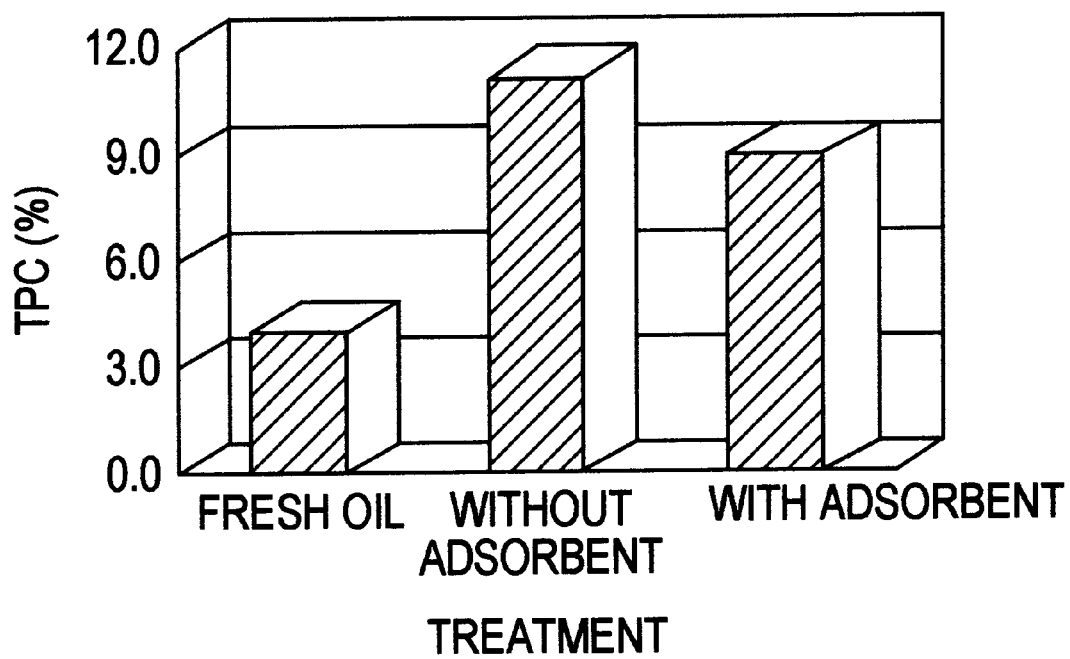
FIG. 6 is a bar graph of changes in TPC for fresh oil, untreated used frying oil, and TF treated used frying oil.

In addition to improvement in FFA, FOS, and color reduction, the TPC accumulation was also controlled, FIG. 6,. For example, at the end of 32 frying, the concentration of polar compounds reached 9% during the frying operation with the adsorbent treatments, but 11.1% without treatment.

At the end of 32 hours refrying with TF and TB treated oils, the FFA value, TPC value, FOS reading and color differences were reduced by 61.9% and 59.7%, 38.0% and 11.3%, 25.2% and 19.5%, and 9.4% and 3.5% of the values in untreated oil, respectively. When the treatment F was performed daily, after 32 hours of frying, the quality parameters, FFA content, TPC value, FOS readings and color difference were reduced by 64.2%, 19.1%, 32.6%, and 4.4%, respectively. The effectiveness of the selected adsorbent mixtures F ad B thus was demonstrated in frying oil recovery.

From the above testing, the invention provides a preferred treating agent for use in recovering used frying oil pursuant to one illustrative embodiment of the present invention that comprises about 25 to about 45 weight % calcium silicate, about 25 to about 45 weight % magnesium silicate and about 25 to about 45 weight % porous rhyolitic material.

A treating agent for use in recovering used frying oil pursuant to another illustrative embodiment of the present invention comprises about 25 to about 45 weight % calcium silicate, about 25 to about 45 weight % magnesium silicate and about 25 to about 45 weight % silicon dioxide.

The invention is described hereabove with respect to treating used frying oils by contact with mixtures of adsorbents, although the invention is not so limited since used frying oils may possibly be treated with a combination of adsorbents selected pursuant to the invention, for example, by contact with each individual adsorbent of the combination in sequential manner. Although the invention has been described with respect to specific embodiments, it is not intended to be so limited since changes and modifications can be made thereto without departing from the spirit and scope of the invention as defined in the appended claims.

We claim:

1. A method of treating used frying oil for reuse, comprising contacting the used frying oil with a treating agent comprising calcium silicate, magnesium silicate and at least one of porous rhyolitic material and silicon dioxide in amounts effective to reduce free fatty acid content of the used frying oil.

2. The method of claim 1 wherein free fatty acid content of said used frying oil are reduced by at least 90%.

3. The method of claim 2 wherein free fatty acid content are reduced to a level comparable to that of fresh frying oil.

4. The method of claim 1 wherein said porous rhyolitic material includes food compatible acid species.

5. The method of claim 1 wherein said silicon dioxide includes hydroxyl species.

6. The method of claim 1 wherein said treating agent comprises a mixture of calcium silicate, magnesium silicate and at least one of porous rhyolitic material and silicon dioxide.

7. The method of claim 1 wherein said treating agent comprises, in weight percent of the oil treated, about 1 to about 3 weight % calcium silicate, about 1 to about 3 weight % magnesium silicate and about 1 to about 3 weight % porous rhyolitic material.

8. The method of claim 1 wherein said treating agent comprises, in weight percent of the oil treated, about 1 to about 3 weight % calcium silicate, about 1 to about 3 weight % magnesium silicate, and about 1 to about 3 weight % silicon dioxide.

9. The method of claim 1 which further includes adding an antioxidant to the treated, used frying oil.

10. The method of claim 9 wherein at least two antioxidants are added comprising butylated hydroxytoulene and propyl gallate to increase the service life of said treated used frying oil.

11. A method of treating used frying oil for reuse, comprising contacting the used frying oil a with treating agent comprising calcium silicate and magnesium silicate and with at least two antioxidants in effective amounts to reduce free fatty acid content and increase oil stability of the used frying oil.

12. The method of claim 11 wherein free fatty acid content of said used frying oil are reduced by at least 90% and oil stability is increased by at least 48%.

13. The method of claim 11 wherein said antioxidants comprise butylated hydroxytoulene and propyl gallate.

14. The method of claim 11 wherein said treating agent means also includes at least one of porous rhyolitic material and silicon dioxide.

15. A treating agent for use in recovering used frying oil, comprising calcium silicate, magnesium silicate and porous rhyolitic material.

16. The agent of claim 15 comprising, in weight percent of the agent, about 25 to about 45 weight % calcium silicate, about 25 to about 45 weight % magnesium silicate and about 25 to about 45 weight % porous rhyolitic material.

17. The agent of claim 15 wherein said porous rhyolitic material includes a food compatible acid species.

18. A treating agent for use in recovering used frying oil, comprising calcium silicate, magnesium silicate and silicon dioxide present in effective amounts to reduce free fatty acid content of used frying oil.

19. The agent of claim 18 comprising, in weight percent of the agent, about 25 to about 45 weight % calcium silicate, about 25 to about 45 weight % magnesium silicate, and about 25 to about 45 weight % silicon dioxide.

20. The agent of claim 18 wherein said silicon dioxide includes hydroxyl species.

* * * * *